(12) United States Patent
Chen et al.

(10) Patent No.: US 7,826,108 B2
(45) Date of Patent: Nov. 2, 2010

(54) SCANNING APPARATUS FOR PREVENTING DEFOCUS ABERRATION

(75) Inventors: Hsi-Yu Chen, Taipei (TW); Chien-Kuo Kuan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 285 days.

(21) Appl. No.: 12/246,211

(22) Filed: Oct. 6, 2008

(65) Prior Publication Data

US 2010/0046041 A1 Feb. 25, 2010

(30) Foreign Application Priority Data

Aug. 22, 2008 (TW) .............................. 97132038 A

(51) Int. Cl.
*H04N 1/04* (2006.01)
(52) U.S. Cl. .................. 358/483; 358/482; 358/497; 358/474; 358/471; 250/208.1; 250/239
(58) Field of Classification Search .................. 358/483, 358/482, 471, 474, 497, 494, 512–514, 505; 250/239, 208.1, 216, 234–236; 399/211; 382/312, 318, 319; 235/454
See application file for complete search history.

(56) References Cited

U.S. PATENT DOCUMENTS

| 6,018,401 | A | * | 1/2000 | Tsai ............................ 358/475 |
| 6,147,343 | A | * | 11/2000 | Christensen ................. 250/234 |
| 6,909,085 | B2 | * | 6/2005 | Huang ........................ 250/239 |
| 7,385,169 | B2 | * | 6/2008 | Saitou et al. ............. 250/208.1 |
| 7,505,184 | B2 | * | 3/2009 | Hayashide ................... 358/497 |
| 7,529,000 | B2 | * | 5/2009 | Ishida et al. ................ 358/474 |
| 2004/0105134 | A1 | * | 6/2004 | Morii et al. ................. 358/474 |
| 2006/0278707 | A1 | * | 12/2006 | Wang et al. ................. 235/454 |

* cited by examiner

*Primary Examiner*—Cheukfan Lee
(74) *Attorney, Agent, or Firm*—Kirton & McConkie; Evan R. Witt

(57) ABSTRACT

A scanning apparatus for preventing defocus aberration is provided. The scanning apparatus includes a flatbed scanning portion and a scanning module. The flatbed scanning portion includes a glass platform. The scanning module includes a scanning module case, a light source, multiple reflective mirrors, a lens, an optical sensing element, a printed circuit board and a metallic post. The metallic post is interconnected between the scanning module case and the printed circuit board. The printed circuit board is not in direct contact with the scanning module case so as to prevent defocus aberration resulting from thermal expansion.

13 Claims, 4 Drawing Sheets

SCANNING APPARATUS FOR PREVENTING DEFOCUS ABERRATION

FIELD OF THE INVENTION

The present invention relates to a scanning apparatus, and more particularly to a scanning apparatus having an optical scanning module.

BACKGROUND OF THE INVENTION

With increasing development of high technology industries, computers become essential electronic apparatuses in our daily lives. For example, computers can be employed for work or amusement purposes. For a purpose of performing specialized functions, a computer system may also include one or more peripheral devices linked to the host computer. For example, a scanning apparatus is one of the common computer peripheral devices for scanning images of documents. The scanned images can be converted into electronic files, which are then stored, processed or spread. With the maturity of the scanning technology, the scanning apparatuses are now rapidly gaining in popularity.

Generally, the commercially available scanning apparatuses are classified into two major types, i.e. flatbed scanners and sheet-feeding scanners. As known, the flatbed scanner or the sheet-feeding scanner has a scanning module as a core component. FIG. 1 is a schematic perspective view of a scanning module of a scanning apparatus according to the prior art. As shown in FIG. 1, the scanning module 100 comprises a scanning module case 101, multiple reflective mirrors 102, a lens 103, an optical sensing element 104 and a printed circuit board 106. For clarification, only the components of the scanning module 100 of the scanning apparatus are shown. First of all, a document to be scanned is placed on a glass platform of the scanning apparatus. During operation of the scanning module 100, a light beam is emitted by a light source (not shown) and projected on the document. The light beam reflected by the document is successively reflected by the multiple reflective mirrors 102 and then focused by the lens 103. The focused light is then imaged onto the optical sensing element 104 so as to convert the light beam into an electrical signal.

For accurately projecting the light beam onto the optical sensing element 104 to achieve a sharp image, the relative positions and the relative angles of the components included in the scanning module 100 should be precisely adjusted. Ideally, for each scanning module 100, the sharpest image is obtained when the light beam is focused on a focal point. In addition, depth of focus (or depth of field) is optics concept that measures the tolerance of an optical element. The depth of focus is located within a specified range in front of or behind the focal point. The images within the depth of focus are deemed as sharp images. Due to the depth of focus, the optical element may have an allowable tolerance. For obtaining a sharp image by the scanning apparatus, the optical sensing element 104 needs to be located at the focal point or within the depth-of-focus range.

From the above discussion, it is found that the imaging resolution of the scanning module 100 is determined according to the arrangement of all optical elements included in the scanning module 100. During operation of the scanning module 100, heat is generated from the scanning module 100. If the heat fails to be effectively dissipated away, the temperature of the scanning module 100 will be rapidly increased. Since the scanning module case 101 is made of a plastic material having a high thermal expansion coefficient, the scanning module case 101 will be thermally expanded. As shown in FIG. 1, the optical sensing element 104 is mounted on the printed circuit board 106 and the printed circuit board 106 is directly fastened on the scanning module case 101. Since the optical sensing element 104 is in direct contact with the scanning module case 101, the optical sensing element 104 is compressed by the scanning module case 101 when the scanning module case 101 is thermally expanded. Under this circumstance, the optical sensing element 104 that is originally located at the focal point or within the depth-of-focus range will be shifted such that the optical sensing element 104 is deviated from the focal point or even moved outside the depth-of-focus range. Since the light passing through the lens 103 fails to be focused at the focal point or within the depth-of-focus range, defocus aberration occurs and the imaging resolution of the scanning module 100 is considerably reduced. For correcting the defocus aberration, a heat-dissipating device is required to facilitate removing heat generated by the scanning module so as to maintain normal operation of the scanning module. The use of the heat-dissipating device is neither user-friendly nor ineffective.

Therefore, there is a need of providing a scanning apparatus for preventing defocus aberration so as to obviate the drawbacks encountered from the prior art.

SUMMARY OF THE INVENTION

The present invention relates to a scanning apparatus, and more particularly to a scanning apparatus having a scanning module for preventing defocus aberration.

In accordance with an aspect of the present invention, there is provided a scanning module for preventing defocus aberration. The scanning module includes a scanning module case, a light source, multiple reflective mirrors, a lens, an optical sensing element, a printed circuit board and a metallic post. The scanning module case has a perforated structure. The light source is disposed on the scanning module case for emitting a light beam and projecting the light beam onto a document. The reflective mirrors are disposed on the scanning module case for successively reflecting the light beam. The lens is used for focusing the light beam. The optical sensing element receives the light beam and converts the light beam into an electronic signal. The printed circuit board is connected to the optical sensing element for receiving the electronic signal, thereby outputting an image of the document. The metallic post is partially embedded into the perforated structure and fixed on the scanning module case. The metallic post has a first end connected to the printed circuit board such that the printed circuit board is not in direct contact with the scanning module case.

In an embodiment, the scanning module further includes a fixing frame between the printed circuit board and the scanning module case, wherein a first surface of the fixing frame is contacted with the printed circuit board and a second surface of the fixing frame is contacted with the metallic post.

In an embodiment, the first end of the metallic post is fixed on the printed circuit board by penetrating a screw through the printed circuit board and the fixing frame and then screwing the first end of the metallic post.

In an embodiment, a second end of the metallic post is fixed on the scanning module case.

In an embodiment, the second end of the metallic post is fixed on the scanning module case by screwing means, hooking means or through engagement between a protrusion and a recess.

Preferably, the optical sensing element is a charge coupled device (CCD).

In accordance with another aspect of the present invention, there is provided a scanning apparatus for preventing defocus aberration and reading an image of a document. The scanning apparatus includes a flatbed scanning portion and a scanning module. The flatbed scanning portion includes a glass platform. The scanning module includes a scanning module case, a light source, multiple reflective mirrors, a lens, an optical sensing element, a printed circuit board and a metallic post. The scanning module case has a perforated structure. The light source is disposed on the scanning module case for emitting a light beam and projecting the light beam onto the document. The reflective mirrors are disposed on the scanning module case for successively reflecting the light beam. The lens is used for focusing the light beam. The optical sensing element receives the light beam and converts the light beam into an electronic signal. The printed circuit board is connected to the optical sensing element for receiving the electronic signal, thereby outputting an image of the document. The metallic post is partially embedded into the perforated structure and fixed on the scanning module case. The metallic post has a first end connected to the printed circuit board such that the printed circuit board is not in direct contact with the scanning module case.

In an embodiment, the scanning module further includes a fixing frame between the printed circuit board and the scanning module case, wherein a first surface of the fixing frame is contacted with the printed circuit board and a second surface of the fixing frame is contacted with the metallic post.

In an embodiment, the first end of the metallic post is fixed on the printed circuit board by penetrating a screw through the printed circuit board and the fixing frame and then screwing the first end of the metallic post.

In an embodiment, a second end of the metallic post is fixed on the scanning module case.

In an embodiment, the second end of the metallic post is fixed on the scanning module case by screwing means, hooking means or through engagement between a protrusion and a recess.

Preferably, the optical sensing element is a charge coupled device (CCD).

In an embodiment, the scanning apparatus further includes an upper cover.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present provides a scanning apparatus having a scanning module for preventing defocus aberration.

Figure 1:
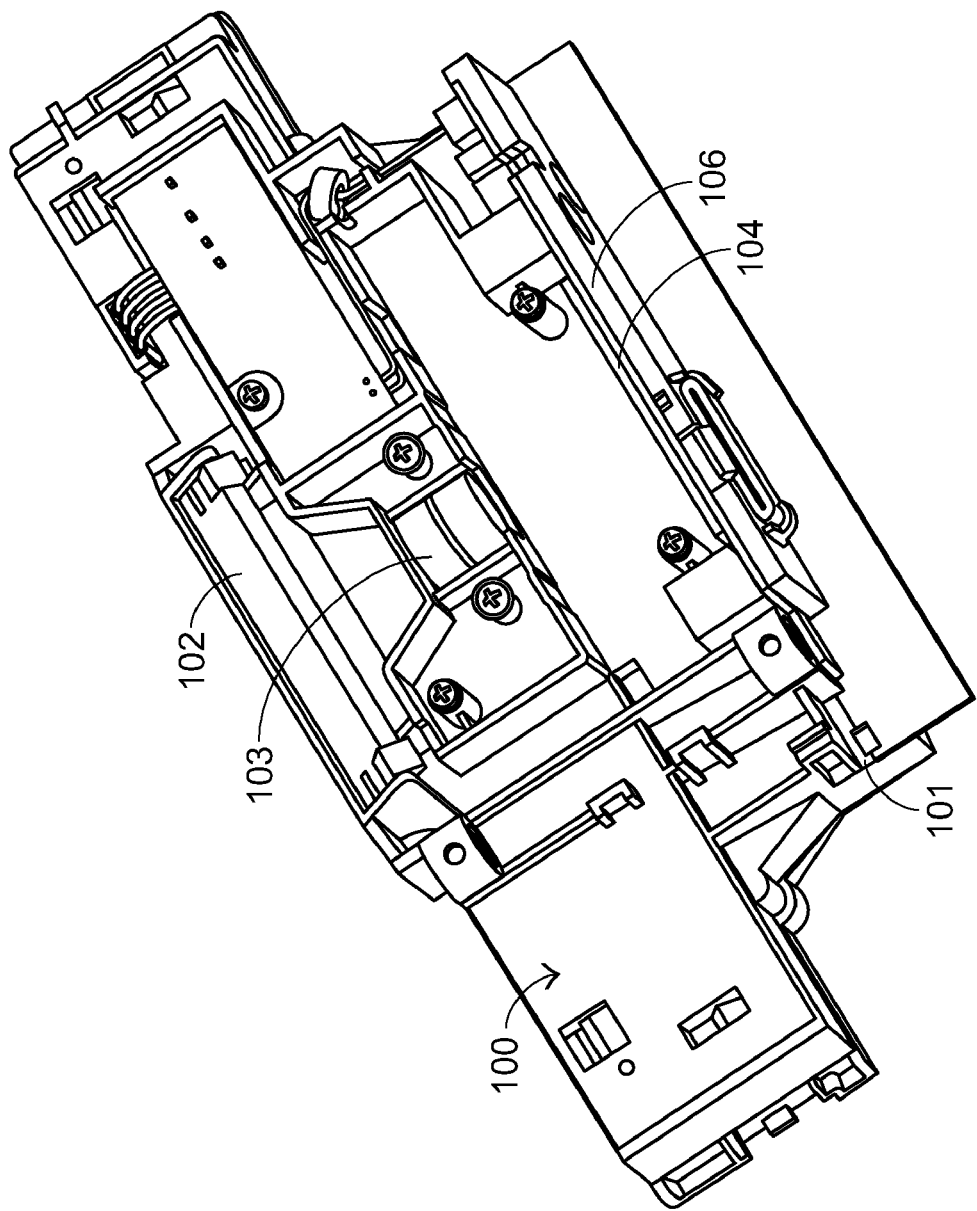
FIG. 1 is a schematic perspective view of a scanning module of a scanning apparatus according to the prior art.
Figure 2:
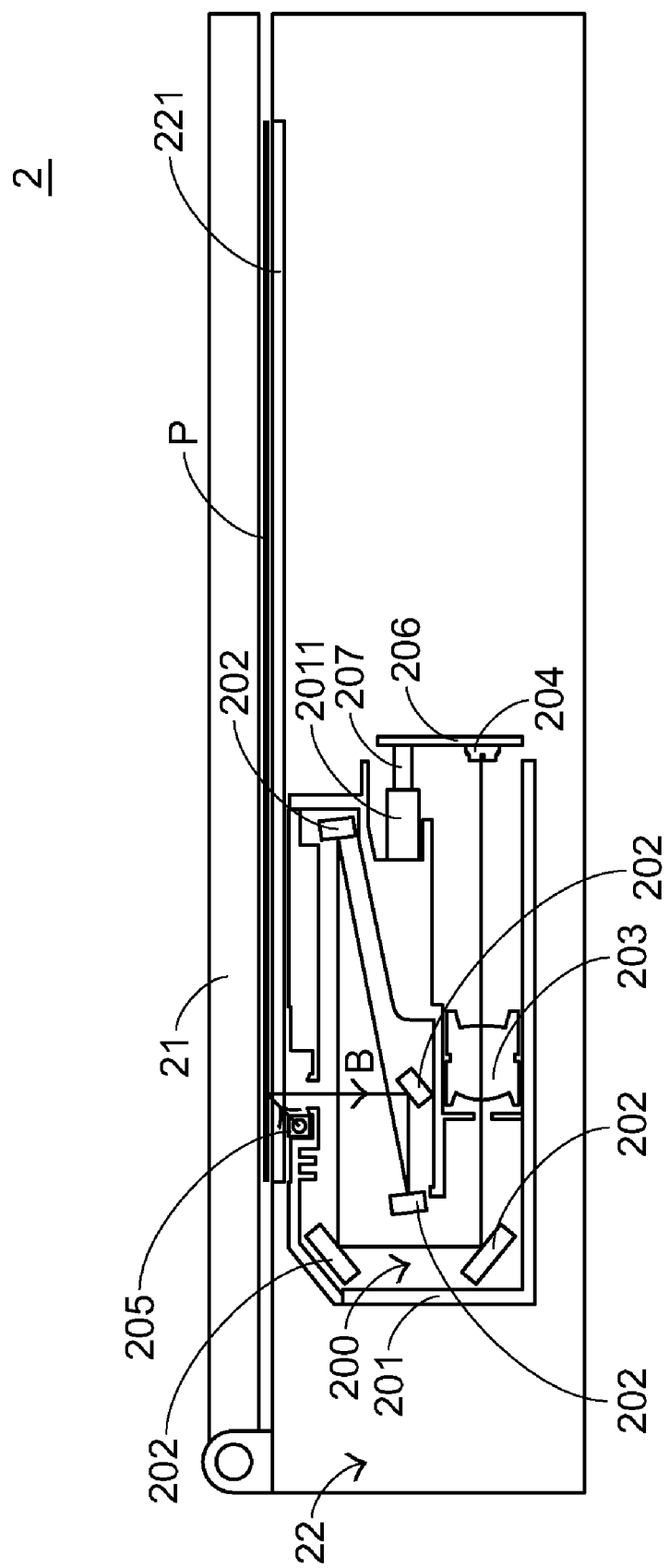
FIG. 2 is a schematic cross-sectional view of a scanning apparatus according to the present invention.

FIG. 2 is a schematic cross-sectional view of a scanning apparatus according to the present invention. The scanning apparatus 2 principally comprises an upper cover 21 and a flatbed scanning portion 22. The flatbed scanning portion 22 comprises a glass platform 221 and a scanning module 200. The document P to be scanned is placed on the glass platform 221. The scanning module 200 principally comprises a scanning module case 201, multiple reflective mirrors 202, a light source 205, a lens 203, an optical sensing element 204 and a printed circuit board 206. An example of the optical sensing element 204 is a charge coupled device (CCD). During operation of the scanning module 200, a light beam B is emitted by a light source 205 and projected on the document P. The light beam B reflected by the document P is successively reflected by the multiple reflective mirrors 202 and then focused by the lens 203. The focused light is then imaged onto the optical sensing element 204 so as to convert the light beam into an electrical signal. In addition, the optical sensing element 204 is mounted on the printed circuit board 206. The electrical signal is then transmitted from the optical sensing element 204 to the printed circuit board 206 so as to output the image of the document P. The scanning operations of the scanning apparatus 2 are similar to those of most typical scanners. Moreover, the scanning apparatus 2 may also include an automatic document feeder arranged above the flatbed scanning portion for successively feeding a stack of sheet-like documents. The operation principles of the automatic document feeder are known in the art, and are not redundantly described herein.

Figure 3:
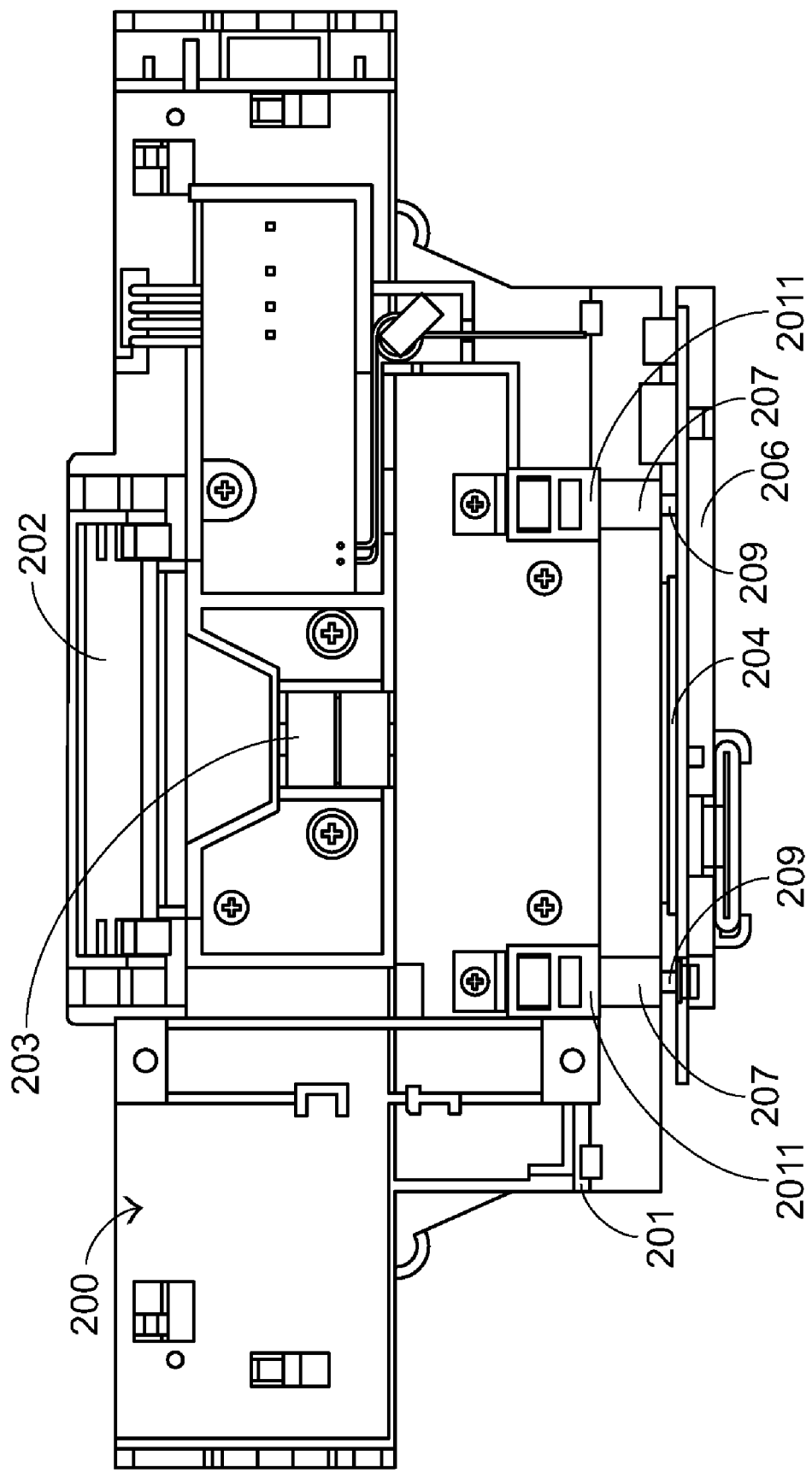
FIG. 3 is a schematic top view illustrating a scanning module of a scanning apparatus according to a first preferred embodiment of the present invention.

Hereinafter, a process of preventing the scanning module from defocus aberration due to thermal expansion will be illustrated with reference to FIG. 3. FIG. 3 is a schematic top view illustrating a scanning module of a scanning apparatus according to a first preferred embodiment of the present invention. As shown in FIG. 3, the scanning module case 201 also has a perforated structure 2011. A first end of the metallic post 207 is connected to the printed circuit board 206. A second end of the metallic post 207 is partially embedded into the perforated structure 2011 and then fixed on the scanning module case 201. In accordance with a key feature of the present invention, the printed circuit board 206 is not in direct contact with the scanning module case 201. By penetrating a screw 209 through the printed circuit board 206 and screwing in the first end of the metallic post 207, the first end of the metallic post 207 is fixed on the printed circuit board 206. The second end of the metallic post 207 is fixed on the scanning module case 201 by any connecting means. In this embodiment, the second end of the metallic post 207 is fixed on the scanning module case 201 by screwing means. Alternatively, the second end of the metallic post 207 may be fixed on the scanning module case 201 by hooking means or through engagement between two complementary structures (e.g. the engagement between a protrusion and a recess). Since the metallic post 207 is interconnected between the scanning module case 201 and the printed circuit board 206, the printed circuit board 206 is indirectly connected with the scanning module case 201 through the metallic post 207. In accordance with another key feature of the present invention, the metallic post 207 is made of a metallic material having a low thermal expansion coefficient. Due to the low thermal expansion coefficient, the metallic post 207 has a slight or negligible degree of expansible deformation when the scanning module case 201 is thermally expanded. In addition, since the metallic post 207 has inherent metallic rigidity, the metallic post 207 is nearly not compressed by the thermally expanded scanning module case 201. Under this circumstance, even if the scanning module case 201 is thermally expanded, the light beam passing through the lens 203 of the scanning module 200 can still be focused at the focal point or within the depth-of-focus range, thereby preventing occurrence of the defocus aberration.

By the way, after the metallic post 207 is integrated into the scanning module 200, the relative positions and the relative angles of the optical components on the scanning module 200 should be precisely computed. According to the computing result, the relative positions and the relative angles of the optical components are corrected. After the correction, the influence of the metallic post 207 is compensated so as to obtain a sharp image.

In the first embodiment, the metallic post 207 is interconnected between the scanning module case 201 and the printed circuit board 206. Since the connect area between the metallic post 207 and the scanning module case 201 or the connect area between the metallic post 207 and the printed circuit board 206 are very small, the metallic post 207 is readily rocked and the reliability is unsatisfied. Therefore, the mechanism for preventing defocus aberration needs to be further improved.

Figure 4:
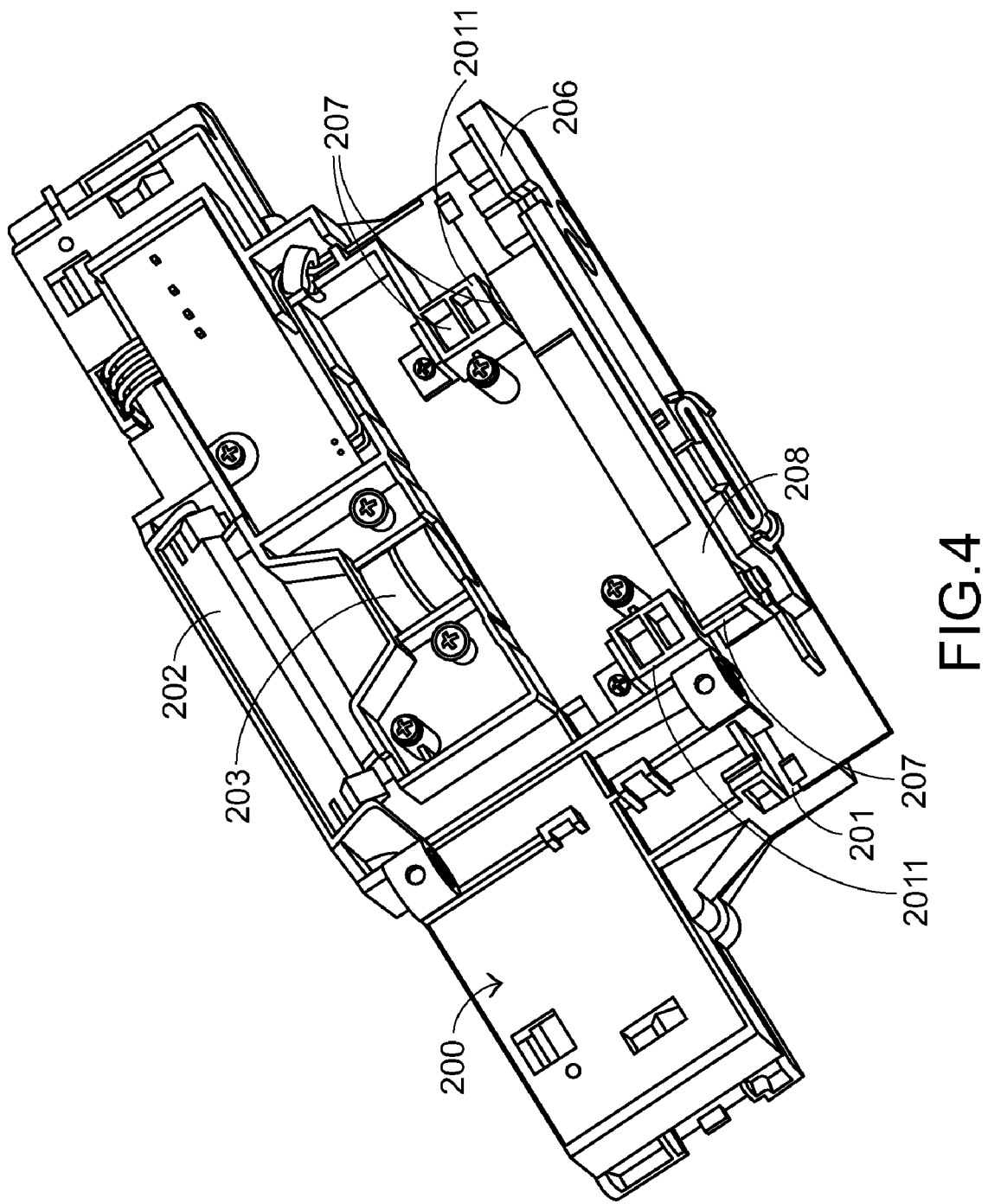
FIG. 4 is a schematic top view illustrating a scanning module of a scanning apparatus according to a second preferred embodiment of the present invention.

FIG. 4 is a schematic top view illustrating a scanning module of a scanning apparatus according to a second preferred embodiment of the present invention. In addition to the metallic post 207, the scanning module 200 of this embodiment comprises a fixing frame 208 for further preventing defocus aberration. The fixing frame 208 is arranged between the printed circuit board 206 and the scanning module case 201. The fixing frame 208 has a first surface contacted with the printed circuit board 206 and a second surface contacted with the metallic post 207. In this embodiment, after a screw (not shown) is penetrated through the printed circuit board 206 and the fixing frame 208 and then screwed in the first end of the metallic post 207, the fixing frame 208 and the metallic post 207 are fixed on the scanning module case 201 by screwing means. Since the fixing frame 208 is contacted with the metallic post 207, the fixing frame 208 may facilitate stabilizing the metallic post 207 and rendering smooth operation of the scanning module 200. Since the fixing frame 208 is not in direct contact with the scanning module case 201, the fixing frame 208 is nearly not compressed by the thermally expanded scanning module case 201 and thus the position or the angle of the fixing frame 208 is not shifted. In this embodiment, the fixing frame 208 is substantially a U-shaped plate. In addition, the fixing frame 208 has an elongate slit (not shown) above the optical sensing element 204. Due to the viewpoint hindrance, the elongate slit is not shown in the drawing. After the fixing frame 208 is fixed onto the printed circuit board 206, the optical sensing element 204 is exposed to the elongate slit and thus the light beam can be received by the optical sensing element 204 through the elongate slit. The shape of the fixing frame 208 is not restricted to the U-shape so long as the fixing frame 208 is contacted with the metallic post 207 to facilitate stabilizing the metallic post 207.

From the above description, the scanning module case is separated from the optical sensing element because the printed circuit board is not in direct contact with the scanning module case. Since the printed circuit board is indirectly connected with the scanning module case through the metallic post having a low thermal expansion coefficient, the metallic post has a slight or negligible degree of expansible deformation when the scanning module case is thermally expanded. In other words, the metallic post is nearly not compressed by the thermally expanded scanning module case and thus the optical sensing element is stabilized to prevent occurrence of the defocus aberration. In comparison with the prior art, the scanning module of the present invention has minimized defocus aberration. Since only a perforated structure and a metallic post are additionally used to reduce the defocus aberration, the extra cost of the scanning module is not considerable. In other words, the present invention is effective for obviating the drawbacks encountered from the prior art in a cost-effective manner.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning module for preventing defocus aberration, said scanning module comprising:
    a scanning module case having a perforated structure;
    a light source disposed on said scanning module case for emitting a light beam and projecting the light beam onto a document;
    multiple reflective mirrors disposed on said scanning module case for successively reflecting said light beam;
    a lens for focusing said light beam;
    an optical sensing element for receiving said light beam and converting said light beam into an electronic signal;
    a printed circuit board connected to said optical sensing element for receiving said electronic signal, thereby outputting an image of said document; and
    a metallic post partially embedded into said perforated structure and fixed on said scanning module case, wherein said metallic post has a first end connected to said printed circuit board such that said printed circuit board is not in direct contact with said scanning module case.

2. The scanning module according to claim 1 further comprising a fixing frame between said printed circuit board and said scanning module case, wherein a first surface of said fixing frame is contacted with said printed circuit board and a second surface of said fixing frame is contacted with said metallic post.

3. The scanning module according to claim 2 wherein said first end of said metallic post is fixed on said printed circuit board by penetrating a screw through said printed circuit board and said fixing frame and then screwing said first end of said metallic post.

4. The scanning module according to claim 1 wherein a second end of said metallic post is fixed on said scanning module case.

5. The scanning module according to claim 4 wherein said second end of said metallic post is fixed on said scanning module case by screwing means, hooking means or through engagement between a protrusion and a recess.

6. The scanning module according to claim 1 wherein said optical sensing element is a charge coupled device (CCD).

7. A scanning apparatus for preventing defocus aberration and reading an image of a document, said scanning apparatus comprising:
    a flatbed scanning portion including a glass platform; and
    a scanning module comprising:
        a scanning module case having a perforated structure;
        a light source disposed on said scanning module case for emitting a light beam and projecting the light beam onto the document;

multiple reflective mirrors disposed on said scanning module case for successively reflecting said light beam;

a lens for focusing said light beam;

an optical sensing element for receiving said light beam and converting said light beam into an electronic signal;

a printed circuit board connected to said optical sensing element for receiving said electronic signal, thereby outputting an image of said document; and a metallic post partially embedded into said perforated structure and fixed on said scanning module case, wherein said metallic post has a first end connected to said printed circuit board such that said printed circuit board is not in direct contact with said scanning module case.

8. The scanning apparatus according to claim 7 further comprising a fixing frame between said printed circuit board and said scanning module case, wherein a first surface of said fixing frame is contacted with said printed circuit board and a second surface of said fixing frame is contacted with said metallic post.

9. The scanning apparatus according to claim 8 wherein said first end of said metallic post is fixed on said printed circuit board by penetrating a screw through said printed circuit board and said fixing frame and then screwing said first end of said metallic post.

10. The scanning apparatus according to claim 7 wherein a second end of said metallic post is fixed on said scanning module case.

11. The scanning apparatus according to claim 10 wherein said second end of said metallic post is fixed on said scanning module case by screwing means, hooking means or through engagement between a protrusion and a recess.

12. The scanning apparatus according to claim 7 wherein said optical sensing element is a charge coupled device (CCD).

13. The scanning apparatus according to claim 7 further comprising an upper cover.

* * * * *